(Model.)
L. KNITTEL.
POCKET BOOK AND PURSE.
No. 244,722.             Patented July 19, 1881.
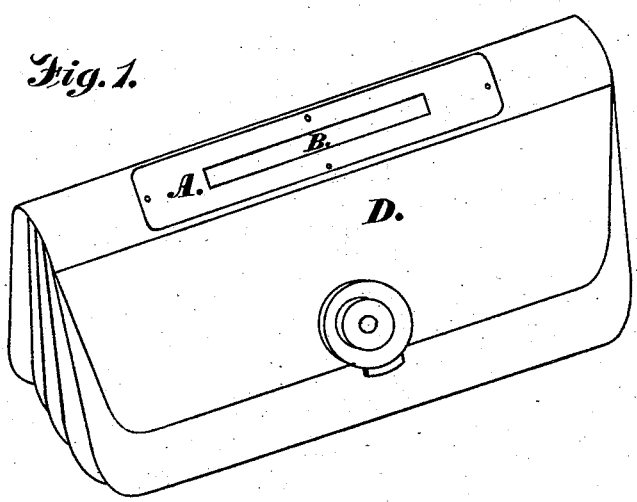
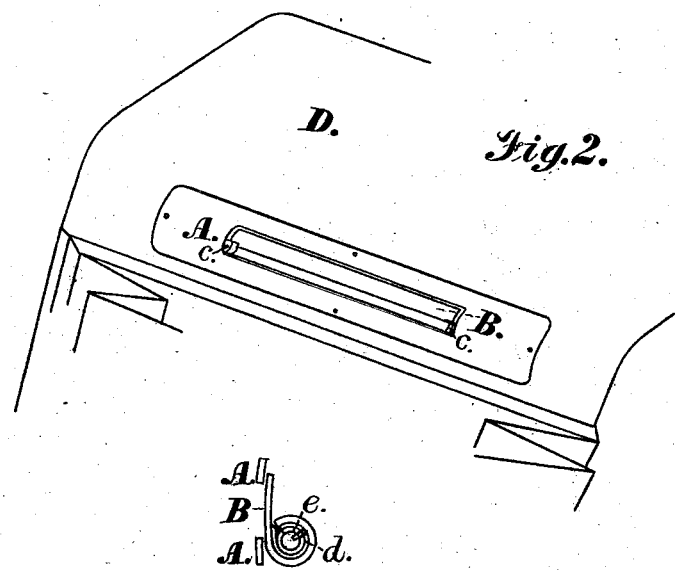
Witnesses:
C. Wyllys Betts
Frank J. Stott
Inventor:
Lorenz Knittel
by J. Windom Hyde atty

UNITED STATES PATENT OFFICE.

LORENZ KNITTEL, OF OFFENBACH, HESSE, GERMANY.

POCKET-BOOK AND PURSE.

SPECIFICATION forming part of Letters Patent No. 244,722, dated July 19, 1881.

Application filed April 25 1881. (Model.) Patented in Germany December 22, 1880.

*To all whom it may concern:*

Be it known that I, LORENZ KNITTEL, a subject of the Emperor of Germany, residing at Offenbach, Hesse, have invented a new and useful Improvement in Pocket-Books and Purses, of which the following is a specification.

My invention relates to an improved form of pocket-book; and its object is to provide a means by which money or other articles can be introduced into the pocket-book without raising or unfastening the cover by which the pocket-book is secured; and the best form of mechanism known to me by which I attain this is illustrated in the accompanying drawings, in which—

Figure 1 is a perspective view of the pocket-book embodying my invention, the pocket-book being closed and fastened. Fig. 2 is a perspective view of the pocket-book with the cover raised, showing the arrangement of the under or interior side of my device. Fig. 3 represents a section of the trap, hereinafter described, detached from the pocket-book.

Similar letters refer to similar parts throughout the several views.

A is a double metal plate, provided with a longitudinal slit sufficiently large to permit the passage of coins, the two sides of the plate being riveted together upon that portion of the cover of the pocket-book which is directly over the opening of the compartments, one side of the plate being placed upon the exterior of the cover of the pocket-book and the other upon the interior, thus inclosing the cover between them. The cover is provided with a slit corresponding to that in the metal plates. This slit or opening is closed by a spring-trap, which, opening downward, allows money to be introduced into the pocket-book by a slight pressure upon the surface of the trap, and then closes automatically, thus making the contents of the pocket-book secure. The method of operating this spring-trap B, illustrated in the drawings, is shown in Figs. 2 and 3.

The under side of the exterior metal plate A is provided with two metal lugs or ears, c, at its ends, in which is inserted and secured a metal bar, e, which serves as a hinge, upon which the trap B turns in opening and closing the slit. Upon this metal bar e is coiled a spring, d, one of the ends of which is fastened to the bar, while its free end rests against the under portion of the trap B. When the trap B is pressed down its lower or interior face acts to coil the spring d upon the bar e, while a removal of the pressure allows the spring to uncoil and thus close the trap B. The spring d and bar e are concealed by a portion of the trap B, which is bent over and around them.

It is obvious that the trap may be formed and applied to the pocket book by a single plate; but I prefer the double plate described. It is also obvious that in some instances a slide or other closing device might be substituted for the spring-covering of the opening, and that the coiled spring d is only one of several equivalent devices which may be employed to close the trap.

It is my intention to apply my spring-trap above described to other kinds of leather-ware, such as porte-monnaies with frames, bag-purses, ladies' shopping-sacks, &c.

What I claim is—

1. A pocket-book or purse having, in addition to its ordinary opening, a slit which may be opened or closed at pleasure, and having strengthened edges which admit articles into the pocket-book or purse without opening the pocket-book, substantially as shown and described.

2. A pocket-book or purse having, in addition to its ordinary form of opening, a slotted plate provided with a locking-trap, substantially as shown and described.

3. A pocket-book or purse provided with one or more metal plates, A, having a slit in them closed by a spring trap or cover, B, turning upon a bar, e, substantially as and for the purpose set forth.

4. A trap or spring-opening for a pocket-book or purse, consisting of one or more metal plates, A, riveted to the same, and provided with a slit closed by a spring-trap, B, substantially as shown and described.

LORENZ KNITTEL.

Witnesses:
CHR. KUHN,
D. SCHÄFER.